Patented May 28, 1946

2,401,244

UNITED STATES PATENT OFFICE 2,401,244

ACIDYL DERIVATIVES OF SUBSTITUTED BIURETS

Arthur J. Hill, New Haven, and William M. Degnan, Southington, Conn., assignors to American Cyanamid Company, New York, N. Y., a corporation of Maine No Drawing. Application June 23, 1943, Serial No. 491,944

7 Claims. (Cl. 260—294)

This invention relates to acidyl biurets which may be represented by the general formula R—CO—B in which R—CO— represents a substituted acetyl group in which R represents a branched chain alkyl radical having at least three carbon atoms and B represents a substituted biuret radical, the bond being to a terminal nitrogen.

The subject matter of the present application is a division of the material contained in our copending application Serial No. 395,624, filed May 28, 1941, and relates more particularly to those compounds represented by the general formula R—CO—B in which B represents a 5-substituted biuret.

According to the present invention the acidyl biurets capable of representation by the general formula R—CO—B in which R represents an alkyl radical having three or more carbon atoms are found to include many members which have a remarkable hypnotic and sedative effect. Where R represents an alkyl radical containing only one or two carbon atoms, as for example when R—CO— represents an unsubstituted acetyl group, no hypnotic properties are observed. Further, the structure of the group represented by R— is important. Excellent hypnotics and sedatives can be prepared from compounds in which R—CO represents the diethylacetyl group.

The invention will be described in greater detail in conjunction with the following experimental data which is meant to be illustrative only and not by way of limitation.

PREPARATION OF ALKYLACYL CHLORIDES

A number of alkylacyl chlorides were prepared from the corresponding acids by allowing the latter to stand with a 100% excess of thionyl chloride for about 12 hours. The resultant product was refluxed to complete the reaction and the acid chlorides so obtained were purified by distillation through a packed column under vacuum.

PREPARATION OF ALKYLACYL ISOCYANATES

The appropriate acid chloride was dissolved in five volumes of carefully dried diethyl ether and added slowly during stirring to a slight excess of freshly prepared silver cyanate suspended in dry ether. A round-bottomed flask, fitted with a sealed stirrer and a reflux condenser carrying a calcium chloride tube, was found to be convenient as a reaction vessel. In every case reaction commenced spontaneously and was completed by refluxing the reaction mixture gently for one to three hours. The suspension was then quickly filtered through a Büchner funnel to remove the silver chloride, and the ether was removed from the filtrate in the usual manner. The residue was then distilled under vacuum. Table I lists a number of representative acyl isocyanates prepared by the above process.

Table I

| Acyl isocyanate | Boiling point, °C. |
|---|---|
| n-Butylethylacetyl | 78–85° at 20 mm. |
| s-Butylethylacetyl | 55–56° at 11 mm. |
| Isoamylethylacetyl | 100–105° at 30 mm. |
| Dibutylacetyl | 68–73° at 12 mm. |
| Phenylethylacetyl | 111–115° at 11 mm. |
| Allylethylacetyl | 83–85° at 34 mm. |
| Ethyldimethylacetyl | 65–70° at 10 mm. |

SUBSTITUTED UREAS

Monoethyl and diethyl urea were prepared by the nitrourea dearrangement method of Davis and Blanchard (J. A. C. S., 51, 1797—1929). Other ureas were prepared by the conventional treatment of the amine hydrochlorides with potassium cyanate.

PREPARATION OF ALKYLACYL BIURETS

These compounds were prepared by the reaction of the appropriate isocyanate with a substituted urea in diethyl ether or petroleum ether. The general technique employed was as follows: the substituted urea was suspended (or dissolved where soluble) in dry ether or petroleum ether in an Erlenmeyer flask. Slightly less than one equivalent of the acyl isocyanate dissolved in dry ether was then added quickly. A reflux condenser carrying a calcium chloride tube was attached to the flask and suspension (or solution) was refluxed gently until the characteristic odor of the isocyanate had disappeared. The heating time varied from three to forty-eight hours. When reaction was complete the suspension (or solution) was cooled and filtered if the product appeared only slightly soluble in cold ether, or the ether was removed by distillation if the product appeared appreciably soluble. The residue was then crystallized from hot water, hot alcohol, or hot dilute alcohol. Two recrystallizations usually sufficed. A number of representative alkylacyl substituted biurets prepared in accordance with the above described process are listed in Table II.

Table II

| Biuret | M. P., °C. | Nitrogen Calcd. | Nitrogen Found |
|---|---|---|---|
| 1-diethylacetyl-5-ethyl | 245 | 18.34 | 18.30 |
| 1-diethylacetyl-5,5-diethyl | 104 | 16.34 | 16.39 |
| 1-diethylacetyl-5-p-phenacetyl | 127 | 14.14 | 14.20 |
| 1-diethylacetyl-5,5-cyclopentamethylene | 113 | 15.61 | 15.68 |

We claim:

1. 1-dialkylacetyl-5-substituted biurets selected from the group consisting of the compounds represented by the formulae

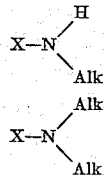

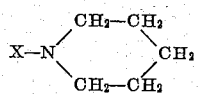

and

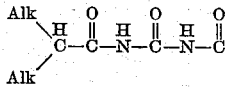

in which X represents the group

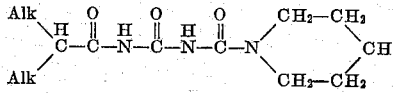

and each Alk represents an alkyl radical.

2. 1-dialkylacetyl-5-alkyl biurets represented by the formula

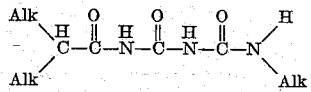

in which each Alk represents an alkyl radical.

3. 1-dialkylacetyl-5,5-dialkyl biurets represented by the formula

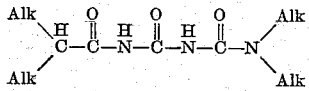

in which each Alk represents an alkyl radical.

4. 1-dialkylacetyl - 5,5 - cyclopentamethylene biurets represented by the formula in which each Alk represents an alkyl radical.

5. 1-diethylacetyl-5-ethyl biuret.
6. 1-diethylacetyl-5,5-diethyl biuret.
7. 1-diethylacetyl - 5,5 - cyclopentamethylene biuret.

ARTHUR J. HILL.
WILLIAM M. DEGNAN.